Patented July 5, 1927.

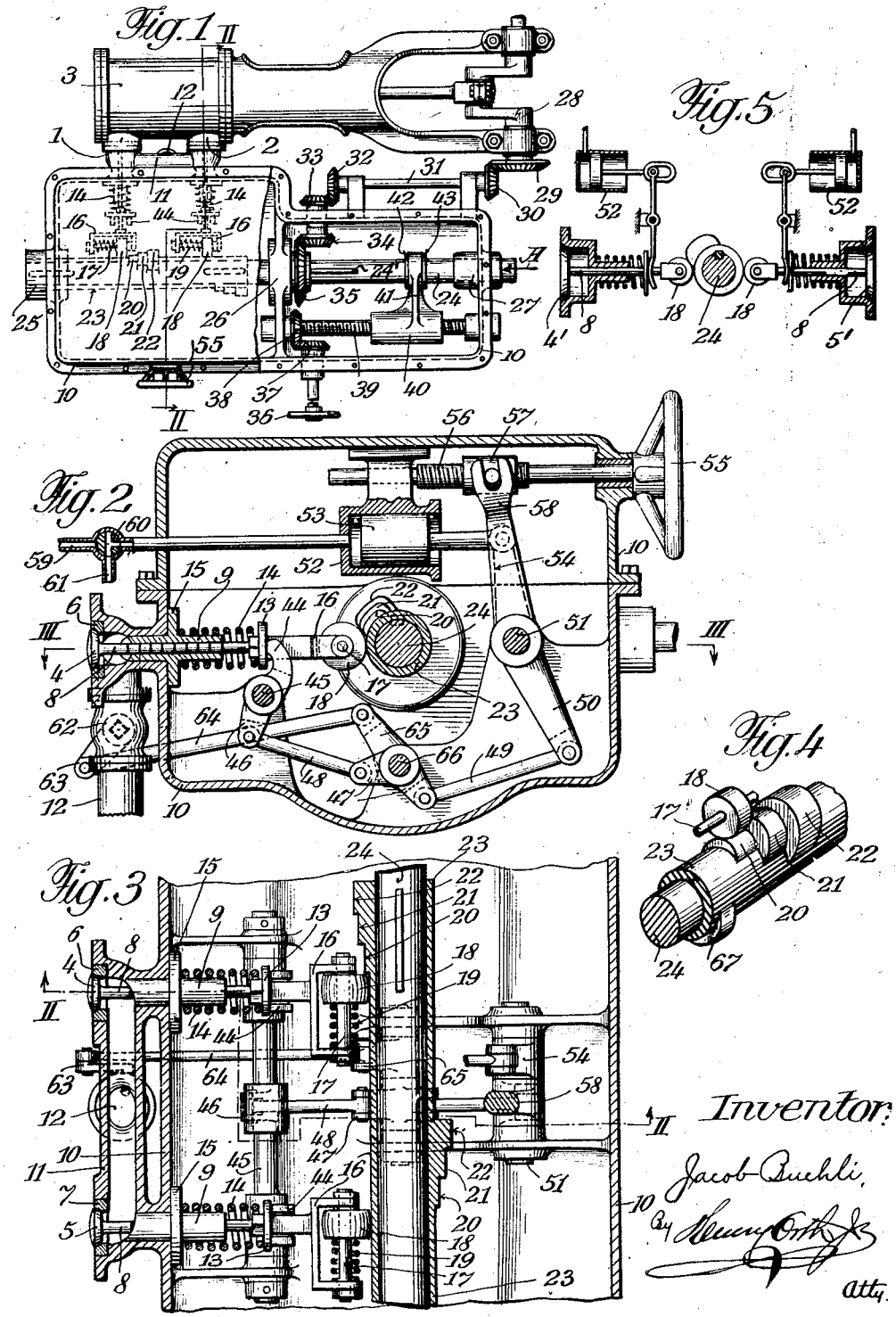

1,634,736

UNITED STATES PATENT OFFICE.

JACOB BUCHLI, OF WINTERTHUR, SWITZERLAND.

VALVE GEAR FOR POWER ENGINES.

Application filed November 23, 1925, Serial No. 70,910, and in Germany December 31, 1924.

The subject matter of the present invention is an improved valve gear for power engines, for instance for steam engines on locomotives, having a cam shaft displaceable in the axial direction and carrying a number of cams the height of which increases by steps. According to the present invention the roller provided on the valve shaft and cooperating with said cam is displaceably arranged at right angles to the valve shaft in the axial direction and against the action of a spring, so that when the roller has to cooperate with a higher cam said roller is caused by the lateral contact with said higher cam to take part in the displacement movement of the cam shaft and compresses thereby said spring until by the continued turning motion the higher cam releases the roller laterally and the latter moves in the axial direction by the action of the spring onto the concentric part of the higher cam which is at the same radial distance as the part of the lower cam with which the roller cooperated previous to the displacement of the cam shaft.

Preferably in order to render possible an unhindered displacement of the cam shaft when the engine is at a standstill a power transmitting organ actuated by a releasing cylinder is arranged to act upon the valve spindle and causes a displacement of the roller out of the path of the cams to be displaced.

It is known to provide oblique facings between the single cams for the roller to run up. If these facings are chosen short they are so steep that the displacement of the cam shaft requires much power, with longer and less steep facings the cam shaft is unduly lengthened.

Further it is known with reversing gears having a non-displaceable cam shaft to turn the axle of the roller obliquely to the axis of the cam shaft in order to cause the roller, which is displaceably mounted on its axle, to run up the adjacent cam. This device presents the drawback that the displacement movement is not positively effected but depends wholly on the various frictional resistances, furthermore this device can only be used with two cams.

The provision of means to bring the roller out of the reach of the cams to enable a non-hindered displacement of the cam shaft when the engine is at a standstill is known per se.

Constructional examples of the subject matter of the present invention are illustrated on the accompanying drawing, in which:

Fig. 1 is a plan view of a steam engine provided with a displaceable cam shaft and the means for effecting an automatic displacement of the roller, for the sake of clearness these means are illustrated in an exaggerated manner as compared with the size of the engine;

Fig. 2 shows on an enlarged scale a cross-section along line II—II in Figs. 1 and 3 through the cam shaft, the valve gear and a mechanism for effecting a displacement of the roller out of the path of the cams when the engine is at a stand-still;

Fig. 3 is a horizontal section along line III—III in Fig. 2;

Fig. 4 is a perspective view of the cam shaft with the cams and the roller cooperating with the former, and Fig. 5 shows in a diagrammatic manner an arrangement in which two valves are actuated from one series of cams.

In the power engine illustrated in Fig. 1 the two branches 1 and 2 on the cylinder 3 for the inlet valves only are shown, the outlet valves being omitted. The valves 4 and 5 (Fig. 3) are of the mushroom or disc type and cooperate with seats 6 and 7 respectively. Each valve is provided with a stem 8 guided in the bush 9. The latter is fixed to a casing 10 with which the valve chest 11 having an inlet branch 12 is integral. A plate 13 is fixed to the stem 8 and a coiled spring 14 is interposed between said plate 13 and a flange 15 of the bush 9 and tends to maintain the valve in the closed position. Fixed to the outer end of the stem 8 or integral with the latter is a fork 16 in which an axle 17 is mounted at right angles to the axis of the valve stem. A roller 18 is displaceable along the axle 17 and a coil spring 19 is interposed between the roller 18 and one cheek of the fork 16. The roller 18 cooperates with a plurality of cams 20, 21 and 22 by means of which the admission of the motive fluid, for instance of steam, is controlled. The cams 20—22 are integral with the hollow sleeve 23 and the two sets of cams 20—22 required for controlling the valves 4 and 5 provided at the two ends of the double acting cylinder are angularly displaced relatively to each other through 180°. The hollow sleeve 23 is fixed to a solid shaft 24 which is mounted in the bearings 25, 26 and 27 of the casing 10. Rotation is imparted to the cam shaft 24 from the engine crank shaft 28 by means of the bevel gears 29, 30, shaft 31 and bevel gears 32, 33 and 34, 35. In order to cause a different cam to cooperate with the roller 18 the cam shaft 24 is displaceable in the axial direction. The bevel gear wheel 35 is loosely mounted on the cam shaft 24 and remains however stationary and in driving engagement with the cam shaft 24 by means of its key sliding in the key way 24' when the latter is being displaced during the running of the engine. The displacement of the cam shaft 24 is effected by means of a hand wheel 36 and bevel wheels 37, 38. the latter being fixed on a screw threaded spindle 39 and causes the rotation of the latter when the hand wheel 36 is turned. A bush 40 provided with internal thread cooperates with the spindle 39 and is displaced in the axial direction of the latter when the spindle is rotated. The bush 40 is provided with an arm 41 the free end of which is shaped to form an eye surrounding the shaft 24 between the collars 42 and 43 provided on the shaft 24; the shaft 24 is thus caused to take part in the displacement movement of the bush 40 along the spindle 39.

If the roller 18 cooperates with the cam 20 as is shown in Fig. 4 and if it is intended to have the roller 18 to cooperate with the next higher cam 21 to provide for a larger admission of the engine, the cam shaft 24 has to be displaced in the direction of the arrow A (Fig. 1). If the roller 18 is behind the lateral facing of the cam 21 the moment in which the cam shaft 24 is displaced, that facing bears against the roller and causes the latter to take part in the displacement movement of the cam shaft and slides thereby along its axle 17 compressing the spring 19 during this movement. The turning movement of the cam shaft changes the mutual position of the cam 21 and the roller 18. When the roller 18 has left the cam 20 and bears on the circumference of the sleeve 23 and the cam 21 has moved past the roller 18 the latter is released in the lateral direction and is returned into its initial position on the axle 17 by the action of the compressed spring 19 and is now in the position to cooperate with the cam 21. In a similar manner the roller 18 may be displaced during the running of the engine to cooperate with the next higher cam 22 and any following cam as the case may be. The shifting of the roller 18 in the opposite direction from a higher cam to a lower cam does not present any difficulties.

The above described arrangement permits thus to alter step by step the admission to the cylinders of a power engine and displacement of the cam shaft requires a comparatively small power only.

In Figs. 2 and 3 of the drawings means are illustrated adapted to effect a displacement of the cam shaft during the standstill of the engine. When the engine is at a standstill and the roller 18 bears laterally against one of the cams 20—22 the cam shaft 24 cannot be axially displaced. To permit the displacement the roller 18 has to be first moved out of the path of cams, to which purpose the following means are provided.

The fork-shaped end of a one armed lever 44 contacts with the disc 13 fixed on the valve stem 8 so that a turning of the lever 44 causes the stem 8 and thereby the fork 16 together with the roller 18 to be moved away from the cam shaft 24. The lever 44 is fixed on an axle 45 on which a further lever 46 is mounted, in operative connection with a bell crank lever 47, links 48 and 49 and the lower arm 50 of a double armed lever fixed to the axle 51. The necessary turning motion is imparted to the axle 51 either from a hydraulic cylinder 52, the piston 53 of which cooperates with the lever 54 fixed to the axle 51 or by a hand wheel 55, the screw threaded spindle 56, the nut 57 engaging with the spindle 56, and upper arm 58 of the double armed lever, the lower arm 50 of which has been mentioned above. 59 denotes a conduit through which a pressure liquid is supplied to the cylinder 52 when the roller 18 has to be moved out of the path of the cams; a three-way cock 60 controlling the flow of liquid to the cylinder 52 or from the cylinder into the discharge pipe 61. When pressure liquid is admitted to the cylinder 52 the lever 54 will turn towards the right when looking at Fig. 2 and the lever 44 will turn towards the left and move the roller 18 out of the paths of the cams.

In Fig. 2 it is assumed that the device is operated by the hand wheel 55 and the three-way cock 60 connects the interior of the cylinder 52 with the discharge pipe 61. When the hand-wheel 55 is turned in the clockwise direction it abuts against the casing 10 and the nut 57 is caused to travel towards the right and causes the desired turning motion of the levers 58, 50. The springs 14 effect the return of the device into the inoperative position when the hand wheel 55 is turned in the anti-clockwise direction.

When it is intended to operate the device by power piston 33, the three-way cock 60 is turned to admit pressure fluid to the cylinder 52, whereupon the piston 53 causes a turning of the levers 54, 50, 58, whereby threaded spindle 56 is displaced towards the right and the hand wheel 55 is moved away from the casing 10.

Fig. 5 shows in a diagrammatic manner an arrangement in which the cam shaft 24 is arranged between two cylinders and one cam is adapted to cooperate with two rollers 18 arranged on the stems 8 of the valves 4' and 5'. There are also hydraulic cylinders 52 provided to effect a displacement of the rollers 18 out of the path of the cams of the cam shaft in a similar manner to that described above with reference to the constructional example illustrated in Figs. 2 and 3.

Preferably a steam valve controlling the supply of steam to the valve chest 11 is so interconnected with the means for displacing the roller 18 out of the path of the cams when the engine is at a standstill, that the valve is closed and the steam supply is cut off before the displacement of the roller 18 and thereby the lifting of the inlet valve is carried out.

An arrangement of this type is illustrated in Fig. 2 in which the steam valve 62 is connected by means of the lever 63 and the rod 64 to a lever 65 fixed to the axle 66 on which the bell crank lever 47 is fixed. The position of the latter is so chosen that its arm connected to the link 48 approaches its inoperative position so that when the pressure liquid is admitted the forward movement of the plunger 53 causes first the closing of the steam valve 62 and thereafter the displacement movement of the roller.

The cam shaft may also be provided with a cam for reversing the engine such as indicated in Fig. 4 by 67.

I claim:

1. In a power engine, in combination, a working cylinder, valves to control the admission of the working fluid to said cylinder, a cam shaft provided with cams of different throw to control the operation of said valves, means to cause an axial displacement of said cam shaft, a roller operatively connected to each valve and cooperating with said cams, said operative connection between the valve and its roller permitting of a displacement of said roller in its axial direction to take part in the displacement movements of said cam shaft, when the roller has to cooperate with a cam of a larger throw, and resilient means opposing said displacement movement of said roller to return it into its initial position.

2. In a power engine, in combination, a working cylinder, valves to control the admission of the working fluid to said cylinder, a cam shaft provided with cams of different throw to control the operation of said valves, means to cause an axial displacement of said cam shaft, a roller operatively connected to each valve and cooperating with said cams, means to permit a displacement of said roller in its axial direction to take part in the displacement movements of said cam shaft when the roller has to cooperate with a cam of a larger throw, and a compression spring opposing said displacement movement of said roller and returning it into its initial position.

3. In a power engine in combination, a working cylinder, valves to control the admission of the working fluid to said cylinder, a cam shaft provided with cams of different throw adapted to control the operation of said valves, means to cause an axial displacement of said cam shaft, a roller operatively connected to each valve and cooperating with said cams, means to permit a displacement of said roller in its axial direction to take part in the displacement movements of said cam shaft, when the roller has to cooperate with a cam of a larger throw, a compression spring to oppose said displacement movement of said roller and to return it into its initial position, and means to displace said rollers out of the path of said cams when the engine is at a standstill.

4. In a power engine in combination, a working cylinder, valves to control the admission of the working fluid to said cylinder, a cam shaft provided with cams of different throw to control the operation of said valves, means to cause an axial displacement of said cam shaft, a roller operatively connected to each valve and adapted to cooperate with said cams, said operative connection between the valve and its roller permitting of a displacement of said roller in its axial direction to take part in the displacement movements of said cam shaft when the roller has to cooperate with a cam of a larger throw, a compression spring to oppose said displacement movement of said roller and to return it into its initial position, and means actuated by pressure liquid to displace said rollers out of the path of said cams when the engine is at a standstill.

5. In a power engine in combination, a working cylinder, admission valves and their stems, cams for operating the stems, a fluid inlet branch, a cut-off valve for said branch, manually operated mechanism to first operate said valve and then move said admission valves and stems out of operative relation to said stems, and fluid actuated means for operating said manual mechanism to operate said valves when the engine is at a standstill to permit an axial shifting of the cams that operate said valves.

6. In a power engine in combination, a working cylinder, valves to control the admission of the working fluid to said cylinder, a cam shaft provided with cams of different throw to control the operation of said valves, means to axially displace said cam shaft, a roller operatively connected to each valve and cooperating with said cams, said operative connection between the valve and its roller permitting of a displacement of said roller in its axial direction to take part in the displacement movements of said cam shaft when the roller has to cooperate with a cam of a larger throw, a compression spring opposing the displacement movement of said roller to return it into its initial position, a device for cutting off the supply of working fluid to said power engine, and mechanism to displace said rollers out of the path of said cams when the engine is at a standstill, said device being first actuated by said mechanism and thereafter said rollers.

In testimony whereof I have signed my name to this specification.

JACOB BUCHLI.